(12) United States Patent
Hideki et al.

(10) Patent No.: US 6,825,144 B2
(45) Date of Patent: Nov. 30, 2004

(54) TRANSLUCENT RARE EARTH OXIDE SINTERED ARTICLE AND METHOD FOR PRODUCTION THEREOF

(75) Inventors: Yagi Hideki, Kagawa (JP); Yanagitani Takagimi, Kagawa (JP)

(73) Assignee: Konoshima Chemical Co., Ltd. (JP)

( * ) Notice: Subject to any disclaimer, the term of this patent is extended or adjusted under 35 U.S.C. 154(b) by 40 days.

(21) Appl. No.: 10/363,352

(22) PCT Filed: Jun. 24, 2002

(86) PCT No.: PCT/JP02/06307
§ 371 (c)(1),
(2), (4) Date: Feb. 28, 2003

(87) PCT Pub. No.: WO03/004437
PCT Pub. Date: Jan. 16, 2003

(65) Prior Publication Data
US 2003/0183991 A1 Oct. 2, 2003

(30) Foreign Application Priority Data
Jul. 5, 2001 (JP) ........................ 2001-205070

(51) Int. Cl.⁷ .................... C04B 35/50; C04B 35/505
(52) U.S. Cl. .................... 501/152; 264/681
(58) Field of Search .................... 501/152; 264/681

(56) References Cited

U.S. PATENT DOCUMENTS

| | | | |
|---|---|---|---|
| 4,098,612 A | | 7/1978 | Rhodes et al. |
| 4,166,831 A | * | 9/1979 | Rhodes et al. ............. 264/1.22 |
| 6,093,347 A | * | 7/2000 | Lynch et al. .......... 252/301.4 R |

FOREIGN PATENT DOCUMENTS

| | | |
|---|---|---|
| EP | 0 277 811 A2 | 8/1988 |
| EP | 0 385 510 A1 | 9/1990 |
| JP | 04-059658 | 2/1992 |
| JP | 04-074764 | 3/1992 |
| JP | 04-238864 | 8/1992 |
| JP | 06-211573 | 8/1994 |
| JP | 09-315865 | 12/1997 |
| JP | 10-273364 | 10/1998 |
| JP | 11-157933 | 6/1999 |

OTHER PUBLICATIONS

International Search Report, pp. 11 and 12, mailed Jul. 23, 2002 for European patent application EP 1 336 598 A1 (counterpart to subject application).

* cited by examiner

*Primary Examiner*—Karl Group
(74) *Attorney, Agent, or Firm*—Webb Ziesenheim Logsdon Orkin & Hanson, P.C.

(57) ABSTRACT

A high-purity rare earth metal oxide material powder of purity of 99.9% or over, of which Al content is 5–100 wtppm in metal weight and Si content is 10 wtppm or under in metal weight, and a binder are used to prepare a molding body of which molding density is 58% or over of the theoretical density. The binder is eliminated by thermal treatment, and then the molding body is sintered in an atmosphere of hydrogen or a rare gas or a mixture of them or in a vacuum at a temperature being not lower than 1450° C. and not higher than 1700° C. for 0.5 hour or over to prepare A transparent sintered rare earth metal oxide body represented by a general formula $R_2O_3$ (R being at least one element of a group comprising Y, Dy, Ho, Er, Tm, Yb and Lu).

9 Claims, No Drawings

TRANSLUCENT RARE EARTH OXIDE SINTERED ARTICLE AND METHOD FOR PRODUCTION THEREOF

FIELD OF THE INVENTION

The present invention relates to a transparent sintered rare earth metal oxide body represented by $R_2O_3$ (R being at least one element of a group comprising Y, Dy, Ho, Er, Tm, Yb and Lu) and a production method thereof. The sintered body of this invention can be used satisfactorily, for example, as materials for infrared rays transmission windows, polarization plates, discharge lamp envelopes, optical parts, and laser oscillators.

PRIOR ART

The rare earth metal oxides represented by a general formula $R_2O_3$ (R being at least one element of a group comprising Y, Dy, Ho, Er, Tm, Yb and Lu) have a cubic crystal structure and show no double refraction. Hence they can provide sintered bodies of excellent transparency when pores and segregation of impurities are completely eliminated from them.

Among them, yttria ($Y_2O_3$) has a melting point of 2415° C. being the highest of those of rare earth metal oxides, has a good heat resistance and a good alkali resistance, and exhibits high transparency in the infrared region. Moreover, as yttria has high thermal conductivity, it is expected as a host material for a solid-state laser. However, as yttria has a very high melting point and exhibits phase transition (between cubic crystal and hexagonal crystal) in the neighborhood of 2280° C., it is difficult for the existing single crystal synthetic techniques to synthesize large crystals of excellent optical properties. On the other hand, as its ceramics (polycrystals) can be synthesized at relatively low temperatures below its melting point, efforts have been made extensively to apply its ceramics as high temperature window materials for infrared rays, discharge lamp envelopes, corrosion resistant members, etc.

In preparing transparent sintered bodies, not limited to those of rare earth metal oxides, what is most important is whether elimination of pores can be well done during grain growth in the sintering stage. A technique of adding a sintering additive is normally used to control the velocity of grain growth. In the greater part of the production methods of yttria which have been reported up to the present, a sintering additive is added.

The following methods are known as production methods of transparent yttria using a sintering additive:

(1) A method of adding $ThO_2$ and sintering in a hydrogen atmosphere at 2100° C. or over (Ceramic Bulletin Vol. 52, No5(1973));

(2) A method of sintering $Y_2O_3$ powder, to which $AlF_3$ is added, by a vacuum hot press (Japanese Provisional Patent Sho 53-120707);

(3) A similar method of hot pressing $Y_2O_3$ powder to which LiF or KF is added (Japanese Provisional Patent Hei 4-59658); and (4) A method of adding $La_2O_3$ or $Al_2O_3$ and sintering in a low $O_2$ atmosphere (Japanese Provisional Patent Sho 54-17911, Japanese Provisional Patent Sho 54-17910).

In the method of (1), radioactive thoria is added as a sintering additive, which is not easy to obtain and handle, although its addition will provide a sintered body of a relatively high transparency. Moreover, as sintering is carried out at a high temperature for a long period of time, the mean grain size is as large as 100 μm or over, and the strength of the material is extremely low. Hence the sintered body is not applicable to daily use. The hot pressing method of (2) allows sintering at a relatively low temperature. It, however, can only provide sintered bodies of which in-line spectral transmittance in the visible region is about 60%.

According to the method of (3), sintered bodies of which in-line spectral transmittance in the infrared region at a wavelength of 2 μm or over is about 80% can be produced by hot press at a temperature of 1500° C. or over. The transmittance in the visible region is not certain because it is not indicated therein. However, the fluorides which are added as sintering additives have low melting points (LiF: 842° C.; KF: 860° C.) and may evaporate in the sintering process to generate a gap in the velocity of grain growth between the circumferential portion and the internal portion of the sample. Therefore, it is estimated to be difficult to produce a homogeneous sintered body when the sample is thick. According to Majima, et al. (Journal of Japan Inst. Metals Vol. 57, No. 10 (1993) P.1221–1226), it is reported that when LiF is used as an additive and hot pressing is used, even if the amount of additive is optimized, fluorine will remain in the central portion of the sample, and the transmittance thereof will be lower in comparison with that of the peripheral portion of the sample. Accordingly, it is not easy to use fluorides as sintering additives to produce large-sized and thick sintered bodies.

According to the method of (4), $La_2O_3$ is added by about 6 to 14 mol %, and $La_2O_3$ which can not be solid dissolved tends to form a segregation phase (refer, for example, to Journal of Materials Science 24 (1989) 863–872), hence it is not easy to prepare an optically homogeneous sintered body. According to the method of $Al_2O_3$ addition, the amount of the additive is from 0.05 wt % to 5 wt %, and high density bodies are prepared by liquid phase sintering at a temperature not lower than the eutectic temperature between $Y_4Al_3O_9$ and $Y_2O_3$ (1920° C.). However, in spite of the sintering at a high temperature, the transmittance of the sintered bodies thus obtained is only 80%, at the highest, of the theoretical transmittance.

On the other hand, production methods of yttria with no sintering additive are disclosed in Japanese Patent No. 2773193 and Japanese Provisional Patent Hei 6-211573. According to Japanese Patent No. 2773193, yttria powder having BET value of 10 $m^2/g$ or over is hot pressed to achieve maximum density of 95% or over of the theoretical density, and after that, HIP treatment is given. The transmittance of the sintered body thus obtained is as good as about 80% in the infrared region of 3–6 μm of wavelengths, but the transmittance in the region of 0.4–3 μm in wavelength remains to be about 75% in average. This insufficient transparency in the shorter wave region in spite of the HIP treatment may be attributed to the use of ultra-fine powder, which is difficult to handle, as the starting material; although the surface of the sintered body is densified by hot pressing, large voids which are difficult to be removed even by the HIP treatment tend to remain in the inner part of the sample.

According to the method of Japanese Provisional Patent Hei 6-211573, transparent bodies are prepared by CIP-molding easily sinterable powder having a mean particle size of 0.01–1 μm and vacuum sintering at 1800° C. or over or giving HIP treatment at 1600° C. or over. It is stated that the sintered bodies obtained by this method have a mean in-line spectral transmittance as high as 80% or over in the visible region, and that it is possible to prepare a sintered body which can make laser oscillation by adding a luminiferous element. However, to prepare a sample of high transparency, it is necessary to execute sintering at a high temperature around 2000° C. in either case of vacuum sintering or HIP treatment. In the case of industrial continuous production, the degradation of the sintering furnace is excessive and the maintenance of the furnace is troublesome. Moreover, when the wavelength gets shorter, the transmittance will drop markedly (when the wavelength is reduced from 1000 nm to 400 nm, the transmittance decreases by 10 or more percent). Hence this method is not appropriate for producing optical parts of which transparency in the visible region is important.

Generally, mother salts of rare earth metal oxide material powders used in the conventional methods are oxalates. The material powders which are obtained by calcining oxalates are composed of highly aggregated secondary particles and their particle size distributions are inhomogeneous. Hence packing by molding can not be done sufficiently, and it is not easy to prepare high density bodies. To improve this point, methods of preparing transparent bodies, which use easily sinterable material powders and low temperature sintering, have been disclosed in recent years (for example, Japanese Provisional Patent Hei 9-315865, 10-273364, 11-189413 and 11-278933).

According to these methods, carbonates are used as the mother salts, and carbonates are calcined to obtain powders of which particle size distributions are relatively even and which show less aggregation. These powders are used as the starting materials to obtain sintered bodies. However, the in-line spectral transmittance of the sintered bodies obtained by these methods in the visible region is about 70% at the highest, and when this figure is compared with the theoretical transmittance (≈82%), it is hard to say that they are transparent bodies comparable to single crystals.

So far, the existing production methods of transparent yttria have been described. It should be noted that there is no method to easily and industrially produce sintered bodies which have excellent transparency comparable to that of single crystals in from the visible region to the infrared region. There are hardly any reports on the production of transparent sintered rare earth metal oxide bodies using a rare earth element other than yttria because rare earth elements are relatively expensive and there are no specific applications for them, although the production conditions are almost comparable to those of the case of yttria.

SUMMARY OF THE INVENTION

An object of the present invention is to provide a sintered rare earth metal oxide body which exhibits good transmittance in from the visible region to the infrared region by using an industrially feasible technique, and a production method thereof.

The transparent sintered rare earth metal oxide body according to the present invention is represented by a general formula $R_2O_3$ (R being at least one element of a group comprising Y, Dy, Ho, Er, Tm, Yb and Lu), the in-line spectral transmittance of the sintered body of 1 mm thick is 80% or over for wavelengths ranging from 500 nm to 6 μm beyond a specific absorption wavelength, and the content of Al in the sintered body, as an amount of Al metal, is 5 wtppm or over and 100 wtppm or under. Al of 5 wtppm or over is needed to density the sintered body, and in particular, to completely eliminate pores so as to obtain an in-line spectral transmittance of 80% or over. Al exceeding 100 wtppm causes Al to segregate in grain boundaries and produce foreign phases, resulting in a decrease in the in-line spectral transmittance.

When the mean grain size of the sintered body is large, even if the Al content is the same, foreign phases tend to deposit in the grain boundaries. Hence the mean grain size of sintered body is preferably 2 μm or over and 20 μm or under.

As Si increases the mean grain size of the sintered bodies, it is desirable to keep the Si content in the sintered bodies at 10 wtppm or under in metal weight so as to set the mean grain size at 2–20 μm.

In the present invention, the transparency of the sintered body is improved by Al addition of 5–100 wtppm whereas the prior art improves the transparency of the sintered bodies by the use of CaO or MgO. Hence it is desirable to keep the CaO content or the MgO content below 5 wtppm. When CaO or MgO is solid dissolved in $Y_2O_3$, the sintered body will tend to get colored. This is attributed to that the difference in the electric charge between trivalent Y ion and divalent Ca ion or divalent Mg ion tends to generate defects which cause color absorption.

In the production method of transparent sintered rare earth metal oxide body according to the present invention, the Al content in metal weight is 5–100 wtppm, the Si content in metal weight is 10 wtppm or under, and high-purity rare earth metal oxide material powder of 99.9% or over in purity is used to prepare moldings of which molding density is 58% or over of the theoretical density. The binder is removed from the moldings by thermal treatment, then the moldings are sintered in an atmosphere of hydrogen or a rare gas or a mixture of them or in a vacuum at a temperature being not lower than 1450° C. and not higher than 1700° C. for 0.5 hour or over. This method can produce sintered bodies of which in-line spectral transmittance, when measured on a sintered body of 1 mm thick, is 80% or over for wavelengths ranging from 500 nm to 6 μm beyond the specific absorption wavelength.

The mean grain size of the sintered body is preferably 2–20 μm, the sintered body is preferably substantially free of deposition of any foreign phases containing Al in grain boundaries, and the material powder and the molding process are preferably controlled so as to keep CaO or MgO below 5 wtppm each in the sintered body.

In the following, the Al content and Si content are indicated in metal weights.

To solve the above-mentioned problems, the present inventors investigated the problems in many aspects and found that a sintered rare earth metal oxide body can be produced, of which in-line spectral transmittance, when measured on a sintered body of 1 mm thick, is 80% or over for wavelengths ranging from 500 nm to 6 μm beyond the specific absorption wavelength. To this end, the material purity, the Al content and the molding density are controlled to prepare moldings, then the binder is removed from the moldings by thermal treatment, and the moldings are sintered in an atmosphere of hydrogen or a rare gas or a mixture of them or in a vacuum at a temperature being not lower than 1450° C. and not higher than 1700° C. for 0.5 hour or over.

In the sintering of the rare earth metal oxide according to the present invention, an extremely small amount of Al (5 wtppm–100 wtppm in metal weight) plays a very important role as a sintering additive. It should be noted that in the present specification the contents of Al and Si are represented in weight ratio in metal weight if not specified otherwise. The density of the molding is represented by a ratio to the theoretical density.

As mentioned in the section of prior art, a variety of techniques of adding a sintering additive have been disclosed, but in most of these cases the sintering additive segregates in the grain boundaries to reduce the velocity of grain boundary migration, which in turn controls the velocity of grain growth and achieves maximum densification. The details of the maximum densification mechanism through sintering when an extremely small amount of Al is contained according to the present invention is not certain. However, Al exhibits the effects as a maximum densification promoter only when the mean grain size of the sintered body is in a range of about 2 $\mu$m–20 $\mu$m, and when the mean grain size is larger than that, foreign phases containing Al are generated.

When the sintering temperature is below 1450° C., irrespective of presence of Al, the maximum densification through grain growth will not proceed sufficiently. Hence only opaque or semi-transparent sintered bodies can be obtained. In this case, the mean grain size is normally less than 2 $\mu$m. When the sintering temperature is not lower than 1450° C. and not higher than 1700° C., the Al content is 5–100 wtppm and the molding density is 58% or over of the theoretical density, the mean grain size of the sintered bodies produced is within a range of 2–20 $\mu$m, depending on the sinterability of the material used, and sintered bodies of excellent transparency can be obtained. When a sample of which Al content is less than 5 wtppm is sintered in a similar manner, the mean grain size is also about 2–20 $\mu$m but the sintered bodies obtained is semi-transparent or opaque. On the other hand, in the case of a sample of which Al content exceeds 100 wtppm, the sintered bodies exhibit greater grain growth in comparison with the sample of which Al content is 100 wtppm or under, and the mean grain size is larger. However, the sintered bodies obtained are semi-transparent or opaque just like those of which Al content is less than 5 wtppm. Al as a sintering additive works as a maximum densification promoter when its content is within a range of 5–100 wtppm, and satisfactory transparent bodies can be obtained only in that case. However, when Al exceeds 100 wtppm, it mainly works as a grain growth promoter, and satisfactory transparent bodies can not be obtained because pores can not be eliminated sufficiently.

On the other hand, when sintering is made at a temperature exceeding 1700° C., grain growth proceeds significantly irrespective of the presence of Al. As pores are not eliminated sufficiently, it is hard to produce sintered bodies of sufficient transparency. In this case, the mean grain size is, for example, 25 $\mu$m or over. At sintering temperatures over 1700° C., even if the Al content is as extremely small as 5–100 wtppm, segregation phases of Al are generated in grain boundaries. Deposition of Al depends on the mean grain size of the sintered bodies, and when the mean grain size is 20 $\mu$m or under, no deposition of Al is observed in any sintering atmospheres. However, when the mean grain size of sintered bodies exceeds 20 $\mu$m, segregation of Al starts to occur in grain boundaries, and when the mean grain size is 30 $\mu$m or over, this phenomenon becomes conspicuous.

Accordingly, Al exhibits effects as a maximum densification promoter when its content is only in the range of 5–100 wtppm, and sintered bodies of excellent transparency can be produced only when sintering is made in a temperature range of 1450° C. or over and 1700° C. or under, which produces no Al deposition, in such a way that the mean grain size is not smaller than 2 $\mu$m and is not larger than 20 $\mu$m. It should be noted that to ensure that an extremely small amount of Al fully exhibits its maximum densification promotion effects to produce sintered bodies of excellent transparency, it is necessary to strictly control the Si content in the raw material. The Si content must be kept not higher than 10 wt ppm and the molding density must be 58% or over of the theoretical density.

In a high-purity rare earth metal oxide powder of 99.9% or over available in the market as a rare earth element, a content of each element including as an impurity is about a few wtppm and about 10 wtppm at the highest. For example, the content of CaO or MgO is 5 wtppm or under. However, Si is contained by about 10 wtppm in many cases, and Si of as high as several tens of wtppm or over is contained in some cases. This is attributed to that the crucible used for sintering a rare earth material is normally made of quartz and adhering water slightly reacts with the quartz crucible to make Si contaminate with the material powder. Moreover, the reactor vessel may be made of glass or lined with glass, or Si may be contained in a precipitating agent in some cases. The concentration of Al as an impurity in high-purity rare earth materials is less than 5 wtppm. Unintended contamination with Al in the production process of sintered bodies can be prevented by using plastic balls such as nylon balls rather than alumina balls for crushing the material powder, and using a high-purity alumina crucible for calcination to reduce the reactivity of the crucible. When these measures are taken and Al is not added intentionally, the Al concentration in the sintered bodies can be kept below 5 wtppm.

As Si generates liquid phases in grain boundaries and promotes grain growth, when the content of Si is high, it will cancel the maximum densification promotion effect of the extremely small amount of Al. Hence Si present in the rare earth metal oxide material powder to be used should be kept not higher than 10 wtppm, and preferably not higher than 5 wtppm. As the greater part of Si present in the material comes from the calcining crucible, it is possible to secure a material having a smaller Si content by using, for example, an alumina crucible for calcination. Si may come from deionized water or distilled water. Hence use of ultra-pure water is preferable. As for the alumina crucible, it is preferable to use a high-purity alumina crucible of, for example, 99% alumina so as to prevent contamination with Al from the crucible.

According to the present invention, it is necessary to prepare homogeneous and high-density moldings having no large pores nor voids inside. Common transparent ceramics are sintered at temperatures lower than their melting points by about 100° C.–300° C., and their mean grain sizes are about 50 $\mu$m or over. This means that to eliminate pores inside the moldings by grain growth, when moldings with many pores (having a lower molding density) are to be sintered, grains are made to grow significantly to produce high density bodies. On the other hand, the sintered bodies according to the present invention are sintered at relatively low temperatures of 1700° C. or under, which do not produce deposition of Al, and their mean grain size is as relatively small as 20 $\mu$m or under. Accordingly, to prepare sintered bodies with excellent transparency without relying on the excessive grain growth for pore elimination, it is necessary to prepare and sinter homogeneous and high-density molding bodies.

Inside molding bodies of which molding density is less than 58% there are a large number of pores due to insufficient packing. It is not easy to achieve proper maximum densification of these molding bodies at a low temperature not higher than 1700° C. On the other hand, inside molding bodies of which molding density is 58% or over there are a relatively smaller number of pores, and these molding bodies can be densified sufficiently at a low temperature. Accordingly, to prepare sintered bodies of excellent transparency, of which in-line spectral transmittance, when measured on a sintered body of 1 mm thick, is 80% or over in the region ranging from 500 nm to 6 $\mu$m in wavelength beyond the specific absorption wavelength, it is necessary to set their molding density at 58% or over, and preferably at 60% or over.

Embodiments

In the following, sintered bodies of embodiments and the production methods thereof will be described.

To prepare sintered bodies, a high-purity easily sinterable material powder of purity of 99.9% or over, of which Si content is 10 wtppm or under, is used. Generally, an element of rare earth materials is prepared by separation and refining by solvent extraction from ores containing a plurality of rare earth elements and calcination of precipitates of oxalates. Accordingly, material powders which have not been subjected to full separation and refining may contain some rare earth elements other than the main component. In some cases, a rare earth element contained as an impurity may exhibit its specific absorption and there is a fear of coloring of the sintered bodies, and this is not desirable. Transition elements such as Fe are not desirable because they work as a coloring source similarly. Hence it is necessary to select a fully refined starting material. However, in the case of laser oscillator materials, a laser active element such as Nd or Yb is added, and in the case of colored glasses, a coloring element is added.

The sinterability of a material powder depends on its mother salt. For example, in the case of yttrium, the sinterability is normally in the following descending order: (1) carbonate, (2) hydroxide, (3) oxalate, (4) ammonium sulfate, (5) sulfate (based on, for example, L. R. Furlong, L. P. Domingues, Bull. Am. Ceram. Soc, 45, 1051 (1966)). However, the kinds of these mother salts are not particularly limited. Any mother salt which is easy to obtain may be used.

The primary particle size of the material powder to be used is not specified particularly. Any powder which is suited to the molding and sintering processes may be selected. Ultra-fine powder has a high sintering activity and can be densified well at a relatively low temperature, but its handling is not easy. Moreover, ultra-fine powder has many aggregated particles and it is not easy to increase the molding density thereof. In the case of coarse powder, packing is easy but the sintering activity is low, and it can not be densified at a low temperature. Accordingly, from the viewpoints of ease in sintering, packing and handling, the specific surface area of the material to be used is preferably about 3–12 m$^2$/g and more preferably about 4–10 m$^2$/g. Moreover, it is most preferable to use a material powder having a homogeneous particle size distribution and showing little aggregation.

Next, moldings of a desired configuration are formed by using the rare earth metal oxide material powder. Molding methods for ceramics include extrusion, injection molding, pressing and casting. In the embodiments molding is not limited to any specific technique; any technique, which can achieve the molding density of 58% or over and causes little contamination with impurities, may be used. At this time, if necessary, Al being a sintering additive is added so that it is dispersed homogeneously depending on the molding method used. For example, in the case of pressing, an appropriate amount of Al is added to the slurry for granule preparation. The slurry is fully mixed in, for example, a ball mill, then dried by a spray drier, etc. and formed into granules for molding.

As for the timing of Al addition, it is not particularly specified provided Al can be homogeneously dispersed in the entire moldings. For example, it may be added in the material compounding stage or the calcination stage without any problems. To make an extremely small amount of Al exhibit its effects fully, it is most preferable to mix Al in the material.

Its addition form is not particularly specified. For example, if Al is to be mixed in the molding stage, an appropriate amount of an aluminium compound such as alumina sol, $Al_2O_3$ powder or $R_3Al_5O_{12}$ powder (R being any of Y, Dy, Ho, Er, Tm, Yb and Lu). If Al is to be added in the material compounding stage, it may be added in the form of aluminium chloride or aluminium hydroxide. As for the purity of an additive, it is not particularly specified because the amount of addition is very small. However, like the material powders, it is preferable to use a high-purity additive. If an additive is to be added in the form of powder, it is preferable to use a powder of which particle size is comparable to the primary particle size of the material powder or smaller than that.

Molding bodies are subjected to heat treatment to remove the binder. The treatment temperature, duration and atmosphere vary depending on the kind of the molding additive added. If pores on the surface of the sample are closed off, it will become difficult to remove the binder. Hence the binding removal is done by taking much time at a temperature below the temperature at which the pores on the surface of the sample are closed. The latter temperature depends on the calcining temperature, sinterability of the material powder to be used and packing of the molding bodies and is normally about 900° C.–1400° C. Hence it is preferable to remove the binder at a temperature below this temperature. As for the atmosphere, the oxygen atmosphere is the most common one, but the binder removal may be done, if necessary, in an atmosphere of wet hydrogen or in an atmosphere of Ar or under reduced pressure.

After the completion of binder removal treatment, the sample is sintered in an atmosphere of hydrogen, a rare gas or a mixture of them or in a vacuum at a pressure not being lower than 1450° C. and not being higher than 1700° C. for 0.5 hour or over. Moreover, after the completion of binder removal, it is effective to close the pores of the sample by primary sintering and then subject the sample to HIP sintering. As for the sintering time, 0.5 hour or over is needed to homogeneously sinter the entire molding bodies. The sintering time is not particularly specified provided it is longer than that. It is normally sufficient to sinter for about 2 to 10 hours when the sample thickness is about 1 to 5 mm. In the case of pressure sintering, it is sufficient to sinter for about 0.5 to 2 hours.

In the following, some embodiments will be described but the present invention is not limited in any way by any of these embodiments.

Embodiment 1

According to the technique of Japanese Provisional Patent Hei 11-157933, $Y_2O_3$ material powder of which mean primary particle size was 0.3 μm, purity was 99.9% or over, and Si content was 3 wtppm was prepared. To be more specific, an aqueous solution of a nitrate of yttrium, an aqueous solution of urea and an aqueous solution of ammonium sulfate were mixed to obtain yttrium:urea:ammonium sulfate=1:6:1 in molar ratio. The mixture was made to react hydrothermally in an autoclave at 125° C. for 2 hours to obtain a carbonate of yttrium. The carbonate obtained was washed with pure water and dried. Next this dry powder was calcined in an alumina crucible in the atmosphere at 1200° C. for 3 hours to obtain a material powder.

60 g of a plasticizer being Ceramisol C-08 (NOF Corp., Ceramisol is a trade name) and 300 g of methyl cellulose as a binder were added to 2 kg of this material powder. Alumina sol (NISSAN CHEMICAL INDUSTRIES, LTD.) equivalent to 50 wtppm as an amount of Al metal was added to the material powder as a sintering additive. 4 kg of pure water was added to the material powder, and the mixture was mixed in a ball mill using a nylon pot and nylon balls for 100 hours. The resulted slurry was heated to concentrate it to a viscosity allowing extrusion. The material was passed through a triple roll mill five times to improve its homogeneity. The material thus obtained was molded by an extruder into a body measuring 60 mm×200 mm×3 mm.

This molding was dried sufficiently, then its temperature was raised to 600° C. at 20° C./hr and the molding was held at 600° C. for 20 hours to defat it. The density of this molding body was determined to be 59.8% by Archimedes' method. To fully defat it, the molding body was further raised up to 1200° C. and held at that temperature for 10 hours. After that, the molding body was sintered in a vacuum furnace at 1650° C. for 8 hours. At this time, the temperature rise rate was 300° C./hr up to 1200° C., and after that the rate was 50° C./hr, and the degree of vacuum in the furnace was $10^{-1}$ Pa or under.

The sintered body thus obtained was mirror-polished with diamond slurry, and the in-line spectral transmittance was measured with a spectrophotometer. As a result, the in-line spectral transmittances at the wavelengths of 500 nm and 800 nm were 80.6% and 82.1% (the sample thickness: 1 mm), respectively. The transmittances in the infrared region were 83.2% and 84.1% at the wavelengths of 3 μm and 6 μm, respectively.

This sample was subjected to thermal etching in the atmosphere at 1500° C. for 2 hours, and its microstructure was observed under an optical microscope. As a result, the mean grain sized was found to be 12.6 μm. The mean grain size was determined with a SEM or the like by freely drawing a line on a high resolution image of the sample. When the length of the line was C, the number of grains on this line was N, and the magnification was M, the mean grain size was given by an equation the mean grain size=1.56C/(MN). Moreover, when the density of the sintered body was determined by Archimedes' method, it was found to be 99.97% of the theoretical density. This sintered body was dissolved by means of an autoclave, and the amounts of Al and Si were determined by ICP method. Al was 47 wtppm and Si was 3 wtppm.

Embodiments 2–7

Various sintered rare earth metal oxide bodies were prepared in a way similar to that of embodiment 1. In every sample, the purity of the material used as a rare earth element was 99.9% or over, Si was 10 wtppm or under, and the molding density was 58% or over. The sintering conditions, the Al content, the in-line spectral transmittance of 1 mm thick sample, and the mean grain size are shown in Table 1. The measurement wavelength used for the in-line spectral transmittance was 500 nm for $Yb_2O_3$ and $Lu_2O_3$. Wavelengths being free from any influences of specific absorption were selected for other sintered bodies.

TABLE 1

Embodiment 2–Embodiment 7

| | Sintering temp./° C. × time/h | Al/ wt ppm | Mean grain size/ μm | In-line spectral transmittance/ % (measure wavelength/nm) |
|---|---|---|---|---|
| Embodiment 2: $Dy_2O_3$ | 1675 × 8 | 90 | 16.9 | 81.2 (600) |
| Embodiment 3: $Ho_2O_3$ | 1625 × 5 | 64 | 7.7 | 80.3 (580) |
| Embodiment 4: $Er_2O_3$ | 1625 × 10 | 31 | 9.0 | 80.5 (600) |
| Embodiment 5: $Tm_2O_3$ | 1650 × 7 | 25 | 13.2 | 81.1 (575) |
| Embodiment 6: $Yb_2O_3$ | 1650 × 7 | 10 | 10.8 | 80.9 (500) |
| Embodiment 7: $Lu_2O_3$ | 1680 × 10 | 52 | 19.3 | 81.5 (500) |

The in-line spectral transmittances of the sintered bodies prepared in embodiments 1 through 7 were measured in wave lengths ranging from 1 μm to 6 μm (beyond the specific absorption wavelength), and each of them was 82% or over in all cases. These results show that sintered bodies having excellent transparency in from the visible region to the infrared region can be prepared by these embodiments.

Comparative Examples 1–5

According to the technique of Japanese Provisional Patent Hei 11-157933, $Y_2O_3$ material powder was prepared. In calcining the material powder, a quartz crucible was used, and material powders having different Si contents were obtained by changing the sampling points in the crucible. In calcining the materials used for comparative example 1 and comparative example 5, high-purity alumina crucibles were used. The material powders thus obtained were used to prepare sintered yttria bodies having different Al contents in a manner similar to embodiment 1. The amount of Si contained in the material, the amount of Al contained in the sintered body, and the in-line spectral transmittance at the wavelength of 500 nm (sample thickness: 1 mm) are shown in Table 2. The molding densities were 58% or over in all of the cases.

TABLE 2

Comparative Example 1–Comparative Example 5

| | Si/wt ppm | Al/wt ppm | In-line spectral transmittance/% |
|---|---|---|---|
| Comparative example 1 | 3 | 2 | 63 |
| Comparative example 2 | 21 | 15 | 48 |
| Comparative example 3 | 12 | 30 | 51 |
| Comparative example 4 | 30 | 50 | 45 |
| Comparative example 5 | 3 | 115 | 57 |

As is the case of comparative example 1, when the amount of Al contained in the sintered body is little, its effect is not exhibited fully. Hence the transparency is not high although the mean grain size is 11 μm which is substantially comparable with that of embodiment 1. As is the case of comparative example 5, when the Al content exceeds 100 wtppm, the mean grain size is 30 μm which is twice or more of that of embodiment 1, and as sufficient maximum densification is not done, the transparency is not high. This sample was observed under a SEM with EDX (energy dispersion type X-ray analysis). Segregation phases of Al were found in grain boundaries. Conversely, comparative examples 2 through 4 indicate that even when the Al content in the sintered body is within the range of 5–100 wtppm, if the amount of Si contained in the material exceeds 10 wtppm, a sufficient transparency can not be obtained.

Accordingly, in the light of these comparative examples it was found that to prepare a sintered body of excellent transparency, it is necessary to strictly control the amount of Si contained in the material and the amount of Al contained in the sintered body.

Embodiments 8, 9 and 10 and Comparative Examples 6, 7 and 8

$Er_2O_3$ material powder of which purity was 99.9% or over, Si content was 3 wtppm and a primary particle size was 0.35 μm was molded by CIP. By changing the molding pressure, molded bodies having different molding densities were produced. Then sintered bodies were prepared in a manner similar to that of embodiment 4. The molding density and the sintered body's in-line spectral transmittance (t=1.0 mm) at the wavelength of 600 nm are shown in Table 3. The amount of Al contained in the sintered body was within the range of 55–60 wtppm in all the cases.

TABLE 3

Molding Density and Transmittance

| | Molding density/% | Transmittance/% | Mean grain size/μm |
|---|---|---|---|
| Comparative example 6 | 49.3 | — | 25.2 |
| Comparative example 7 | 53.2 | 45.3 | 17.3 |
| Comparative example 8 | 57.6 | 67.5 | 18.6 |
| Embodiment 8 | 58.2 | 80.2 | 13.2 |
| Embodiment 9 | 60.5 | 80.6 | 12.7 |
| Embodiment 10 | 64.4 | 81.1 | 10.8 |

In comparative example 6, the grain growth was marked in comparison with other cases, a large number of pores remained inside the sintered body, and segregation of Al was also observed. As it was an opaque body, it was impossible to measure the transmittance. Comparative examples 7 and 8 and embodiments 8, 9, and 10 show that the transmittance increases with the increase in molding density, and that the molding density of 58% or over is needed to obtain a sintered body of excellent transparency of 80% or over.

Embodiments 11–14 and Comparative Examples 9–12

Alumina sol was added to $Yb_2O_3$ material powder of which material purity was 99.9% or over and Si content was 2 wtppm to set the Al content in the sintered body at 50 wtppm, and molding bodies having a molding density of 59.5% were prepared in a manner similar to that of embodiment 1. The molding bodies were sintered at various sintering temperatures for 10 hours to prepare sintered $Yb_2O_3$ bodies. The sintering temperature, the mean grain size of the sintered body obtained, and the in-line spectral transmittance thereof at the wavelength of 500 nm are shown in Table 4. When the sintering temperature was within the range of 1450–1700° C., the mean grain sizes were 2–20 μm, and the in-line spectral transmittance was 80% or over. When the temperature was outside this range, the in-line spectral transmittance decreased extremely.

TABLE 4

Sintering Temperature and In-line Spectral Transmittance

| | Sintering temp./° C. | Mean grain size/μm | In-line spectral transmittance/% |
|---|---|---|---|
| Comparative example 9 | 1400 | 1.2 | — |
| Comparative example 10 | 1430 | 1.7 | 46.8 |
| Embodiment 11 | 1460 | 2.0 | 80.0 |
| Embodiment 12 | 1600 | 7.8 | 80.3 |
| Embodiment 13 | 1650 | 11.0 | 80.9 |
| Embodiment 14 | 1695 | 18.4 | 81.1 |
| Comparative example 11 | 1720 | 28.2 | 54.3 |
| Comparative example 12 | 1750 | 41.6 | 30.8 |

Embodiment 15

Easily sinterable yttria material powder was prepared in a manner similar to that of embodiment 2 of Japanese Provisional Patent Hei 11-189413. To be more precise, yttrium chloride was dissolved in pure water. While the solution was kept cooled and stirred, aqueous ammonia was added slowly to the solution dropwise to precipitate yttrium hydroxide. Next, aqueous solution of ammonium sulfate was added to the solution and the mixture was stirred for 3 hours. The precipitate was filtrated and washed with pure water and dried. The precursor or yttrium hydroxide was calcined at 1100° C. to prepare a material powder. To prevent contamination of the material with Si, the compounding of the material was made in a polytetrafluoroethylene container instead of a glass beaker, and an alumina crucible was used in calcining the precursor. The purity of the material powder thus obtained was determined by ICP emission analysis. The purity was 99.9% or over, and Si was 2 wtppm.

Alumina powder (TM-DAR made by DAIMEI KAGAKU; the mean primary particle size is 0.3 μm, and TM-DAR is a trade name) was added to this powder. They were fully mixed and crushed in an alumina mortar. The powder was put into a metal mold of φ20 mm and subjected to primary molding at 20 MPa. Then CIP molding was given under the pressure of 250 MPa. The amount of Al contained in the molding and the molding density were measured to be 75 wtppm and 59.6%, respectively. This molding body was heated up to 1650° C. at a rate of 100° C./hr and kept at that temperature for 10 hours, then it was cooled at a rate of 200° C./hr. The degree of vacuum at the time of sintering was $10^{-1}$ Pa or under. The sintered body thus obtained was evaluated in a manner similar to that of embodiment 1. The in-line spectral transmittance at the wavelength of 500 nm was 80.3%, and the mean grain size was 14.2 μm.

A sintered body to which no Al was added was also prepared in a similar manner. Its in-line spectral transmittance was 48%, which was substantially comparable to that of the sintered body obtained in the embodiment of Japanese Provisional Patent Hei 11-189413 (about 45% after sintering at 1700° C.). These findings show that with the inclusion of an extremely small amount of Al, a sintered body of excellent transparency can be obtained independently of the preparation method of the material powder used.

Comparative Example 13

The CaO content and the MgO content in the yttrium oxide material powder prepared in embodiment 1 were less than 5 wtppm, respectively. CaO corresponding to 200 wtppm, in stead of alumina sol, was added to this material powder. They were mixed by means of the nylon balls and the nylon pot. After that, they were treated in a manner similar to that of embodiment 1 to prepare a sintered yttria body. Both faces of the sintered body were mirror-polished with diamond slurry. When the sample thickness was 1 mm, the in-line spectral transmittance of the sintered body was about 80% at the wavelength of 500 mm.

The sintered yttria body of embodiment 1 and the sintered yttria body of comparative example 13 were left to stand in a place exposed to the sunshine for three months. The sintered body of the embodiment showed no changes even after three months. The sintered body of the comparative example was slightly colored yellow after one month, and it was evidently colored yellow after three months. For the purpose of confirmation, a sintered yttria body having CaO content of 50 wtppm was prepared, other conditions being similar to those of comparative example 13. When it was left to stand in a place exposed to the sunshine for three months, it was colored similarly.

What is claimed is:

1. A transparent sintered rare earth metal oxide body represented by a general formula $R_2O_3$ (R being at least one element of a group comprising Y, Dy, Ho, Er, Tm, Yb, and Lu), having an in-line spectral transmission not less than 80% taken at a wavelength range of 500 nm–6 $\mu$m beyond a specific absorption wavelength on a thickness of 1 mm of the sintered body, and including 5–100 wtppm of Al in metal weight.

2. A transparent sintered rare earth metal oxide body of claim 1, characterized in that a mean grain size of the sintered body is 2–20 $\mu$m.

3. A transparent sintered rare earth metal oxide body of claim 2, characterized in that a Si content of the sintered body is not more than 10 wtppm in metal weight.

4. A transparent sintered rare earth metal oxide body of claim 1, characterized in that a mean grain size of the sintered body is 2–20 $\mu$m and grain boundaries in the sintered body are substantially free from deposited foreign phases containing Al.

5. A transparent sintered rare earth metal oxide body of claim 3, characterized in that each content of CaO and MgO is less than 5 wtppm.

6. A transparent sintered rare earth metal oxide body of claim 3, characterized in that said sintered body is a laser oscillator material containing a laser active element.

7. A production method of a transparent sintered rare earth metal oxide body represented by a general formula $R_2O_3$ (R being at least one element of a group comprising Y, Dy, Ho, Er, Tm, Yb, and Lu), comprising a step for preparing a molding body having molding density of not less than 58% of a theoretical density from a rare earth metal oxide material powder and a binder, wherein the rare earth metal oxide material powder has a purity of not less than 99.9%, a Al content of 5–100 wtppm in metal weight, and a Si content of not more than 10 wtppm in metal weight and a step for sintering the molding body in an atmosphere of hydrogen, a rare gas, or a mixture of them, or in a vacuum at a temperature not lower than 1450° C. and not higher than 1700° C. for not less than 0.5 hour, after eliminating the binder from the molding body by thermal treatment.

8. A production method of a transparent sintered rare earth metal oxide body of claim 7, characterized in that the molding body is sintered to have a 2–20 $\mu$m mean grain size.

9. A production method of a transparent sintered rare earth metal oxide body of claim 8, characterized in that the molding body is sintered to be substantially free from deposition of foreign phases containing Al at grain boundaries.

* * * * *

UNITED STATES PATENT AND TRADEMARK OFFICE
CERTIFICATE OF CORRECTION

PATENT NO. : 6,825,144 B2
DATED : November 30, 2004
INVENTOR(S) : Hideki et al.

It is certified that error appears in the above-identified patent and that said Letters Patent is hereby corrected as shown below:

<u>Title page,</u>
Item [56], References Cited, OTHER PUBLICATIONS, "patent application EP 1 336 598 A1" should read -- patent application EP 1 336 596 A1 --

Signed and Sealed this

Seventh Day of June, 2005

JON W. DUDAS
*Director of the United States Patent and Trademark Office*